United States Patent [19]

Inaniwa et al.

[11] Patent Number: 5,726,881
[45] Date of Patent: Mar. 10, 1998

[54] CENTRIFUGAL APPARATUS WITH OVERSPEED PROTECTION

[75] Inventors: Masahiro Inaniwa; Shinji Watanabe; Nobuharu Kido; Noriyasu Matsufuji; Yoshitaka Niinai; Osamu Kawanobe, all of Hitachinaka, Japan

[73] Assignee: Hitachi Koki Co., Ltd., Japan

[21] Appl. No.: 514,814

[22] Filed: Aug. 14, 1995

[30] Foreign Application Priority Data

Aug. 17, 1994 [JP] Japan .................. 6-193019
Sep. 6, 1994 [JP] Japan .................. 6-212311

[51] Int. Cl.$^6$ .................................. G05B 9/02
[52] U.S. Cl. .................. 364/184; 364/133; 364/141; 364/174; 364/565; 318/462; 318/801; 361/23; 361/51
[58] Field of Search ................. 318/462, 434, 318/439, 719, 799, 801, 254; 361/23, 51; 364/184, 132, 133, 187, 138, 141, 142, 174, 474.12, 474.3, 550, 551.01, 565, 566; 324/160–163, 167, 177; 73/335

[56] References Cited

U.S. PATENT DOCUMENTS

| 4,903,191 | 2/1990 | Fries ........................ 364/132 |
| 5,229,693 | 7/1993 | Futami et al. ............. 318/254 |
| 5,280,228 | 1/1994 | Kanouda et al. ......... 318/801 |
| 5,422,570 | 6/1995 | Moreira ..................... 324/177 |
| 5,446,354 | 8/1995 | Hiruma ...................... 318/439 |
| 5,469,032 | 11/1995 | Otake ....................... 318/439 |

FOREIGN PATENT DOCUMENTS

6-12955  2/1994  Japan.

*Primary Examiner*—James P. Trammell
*Assistant Examiner*—Hal D. Wachsman
*Attorney, Agent, or Firm*—Rossi & Associates

[57] ABSTRACT

A centrifugal apparatus includes a rotor having a marker for generating an index signal, a motor for rotating the rotor, first and second detectors for detecting the index signal with rotation of the rotor to generate first and second detection signals, an input terminal for receiving supply power, a drive circuit for generating a drive signal from the supply power according to the first detection signal, and first and second switch circuits for controlling the supply of the drive signal to the motor. First and second judging portions are used to detect whether the first and second detection signals are respectfully generated within a given condition. The first judging portion operates the first switch circuit to stop the drive signal from being supplied to the motor when the first detection signal is not generated within the given condition, while said second judging portion operates the second switch circuit to stop the drive signal from being supplied to the motor when the second detection signal is not generated within the given condition. The first and second detectors, judging portions, and switch circuits, respectively, independently operate to provide double feedback loops, so that an overspeed or the like is prevented.

8 Claims, 9 Drawing Sheets

FIG. 9 PRIOR ART

CENTRIFUGAL APPARATUS WITH OVERSPEED PROTECTION

BACKGROUND OF THE INVENTION

1. Field of the Invention

This invention relates to a centrifugal apparatus with overspeed protection for rotating a rotor with overspeed protection.

2. Description of the Prior Art

Figure 9:
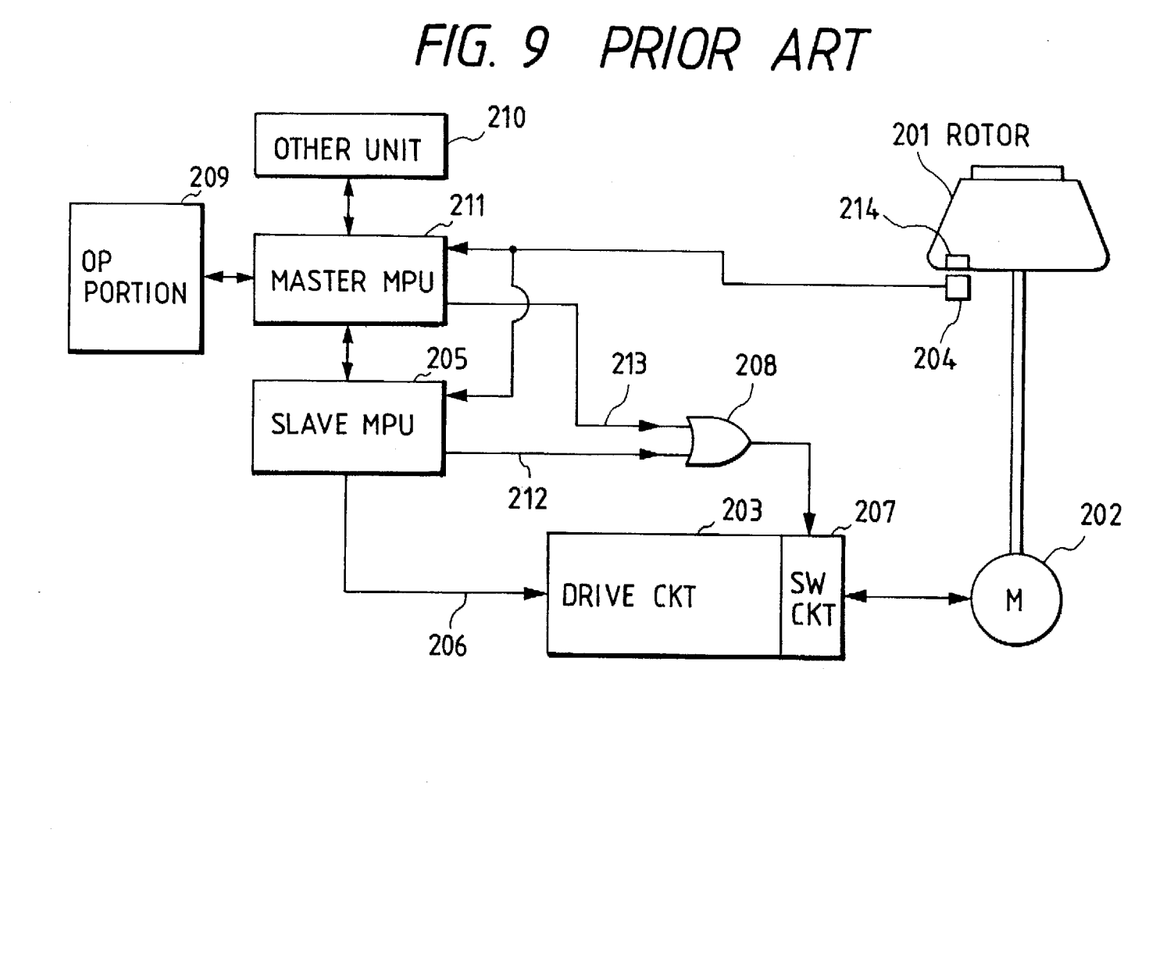
FIG. 9 is a bock diagram of a prior art centrifugal apparatus with an overspeed protection.

A centrifugal apparatus with overspeed protection comprising a rotor, a driving motor for rotating the rotor, a detector for detecting a rotation speed of the rotor, and a controller for protecting an overspeed running of the rotor in response to the detector is known. FIG. 9 is a block diagram of a prior art centrifugal apparatus with an overspeed protection disclosed in U.S. Pat. No. 4,903,191. An exchangeable rotor 201 is rotated by a motor 202. A rotation of the exchangeable rotor 201 is detected by a detector 204 by detecting a magnet field from a magnet fixed to the exchangeable rotor. A master microprocessor (mpu) 211 and a slave microprocessor 205 separately detect the rotation speed of the exchangeable rotor 201 and the kind of the exchangeable rotor 201. If either of the master microprocessor 211 or the slave microprocessor 205 detects an overspeed running of the exchangeable rotor 201 in accordance with the detected kind of the exchangeable rotor, that is, either of the master microprocessor 211 or the slave microprocessor 205 detects whether the rotation speed of the exchangeable rotor 202 exceeds a maximum value determined in accordance with the detected kind of the exchangeable rotor, an overspeed protection signal is supplied to an overspeed protection switch for cutting off drive signals to the motor 202. Therefore, the overspeed running of the exchangeable rotor is protected with a feed back loop from the magnet 214, the master microprocessor 211 or the salve microprocessor 205, an OR gate 208, and the switch circuit 207, and the motor 202, wherein the master microprocessor 211 and the slave microprocessor 205 are doubled with respect to feedback loops. Therefore, a runaway in the master microprocessor 211 or the slave microprocessor 205 and an erroneous operation due to a bug in a program in the master microprocessor 211 or the slave microprocessor 205 can be avoided. However, there is a problem that an erroneous operation in the overspeed protection operation cannot be avoided perfectly because there is still a single feedback loop portion in the feed back loop.

SUMMARY OF THE INVENTION

The aim of the present invention is to provide an improved centrifugal apparatus with overspeed protection.

According to the present invention there is provided a centrifugal apparatus comprising: a rotor having a marker portion; a motor responsive to a drive signal for rotating the rotor; a first detector for detecting the marker portion with rotation of the rotor and generating a first detection signal; a second detector for detecting the marker portion with the rotation of the rotor; an input terminal for receiving a supply power; a drive circuit responsive to a command for generating the drive signal from the supply power in accordance with the first detection signal; first and second switch circuits for controlling of supplying the drive signal to the motor, the first and second switch circuits being provided in a route from the input terminal to the motor via the drive circuit in series; a first judging portion for detecting whether the first detection signal is generated within a predetermined condition and for operating the first switch circuit such that the drive signal is not supplied to the motor when the first detection signal is not generated within the predetermined condition; and a second judging portion for detecting whether the second detection signal is generated within the predetermined condition and for operating the second switch circuit such that the drive signal is not supplied to the motor when the second detection signal is not generated within the predetermined condition.

In the centrifugal apparatus mentioned above, the first and second judging portions independently detect first and second rotation speeds from the first and second detection signals respectively, the first and second judging portions independently detect whether the first rotation speed exceeds a predetermined value and whether the second rotation speeds exceed the predetermined value respectively, the first judging portion controls the first switch such that the drive signal is not supplied to the motor when the first rotation speed exceeds the predetermined value, and the second judging portion controls the second switch such that the drive signal is not supplied to the motor when the second rotation speed exceeds the predetermined value.

In the centrifugal apparatus, the rotor is detachable from the motor and the marker portion has information indicative of a kind of the rotor, the first and second judging portions further detect the information from the first and second detection signals respectively and determine first and second maximum values in accordance with the detected information respectively, the first judging portion operates the first switch such that the drive signal is not supplied to the motor when the first rotation speed exceeds the first maximum value, and the second judging portion operates the second switch such that the drive signal is not supplied to the motor when the second rotation speed exceeds the second maximum value.

In the centrifugal apparatus, the marker portion comprises at least a magnet.

In the centrifugal apparatus, the drive circuit comprises an inverter circuit for generating phase signals and a power bridge circuit for generating the drive signal from the phase signals and the first switch circuit is provided between the input terminal and the inverter circuit. In this centrifugal apparatus, the second switch circuit comprises photocouplers for transmitting the phase signals to the power bridge circuit, a switch, and a power source for supplying a power to the photocouplers through the switch and the second judging portion controls the second switch circuit such that the drive signal is not supplied to the motor by controlling the switch when the second detection signal is not generated within the predetermined condition.

In the above mentioned centrifugal apparatus, the drive circuit responsive to the command generates the drive signal from the supply power in accordance with the first detection signal. The first judging portion detects whether the first detection signal is generated within a predetermined condition and operates the first switch circuit such that the drive signal is not supplied to the motor when the first detection signal is not generated within the predetermined condition. That is, if the actual rotation speed exceeds the predetermined value or if the kind code detected from the first detection signal is incorrectly detected, the first switch circuit is operated not to supply the drive signal to the motor. Similarly, the second judging portion detects whether the second detection signal is generated within the predetermined condition and operates the second switch circuit such that the drive signal is not supplied to the motor when the second detection signal is not generated within the predetermined condition. That is, if the actual rotation speed exceeds the predetermined value or if the kind code detected from the second detection signal is incorrectly detected, the second switch circuit is operated not to supply the drive signal to the motor. This detection of the overspeed or the incorrectly detected kind code and the cutting off of the drive signal are independently effected and the first and second switch circuits are provided in series. Therefore, a sure overspeed protection is provided.

BRIEF DESCRIPTION OF THE DRAWINGS

The object and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

Figure 1:
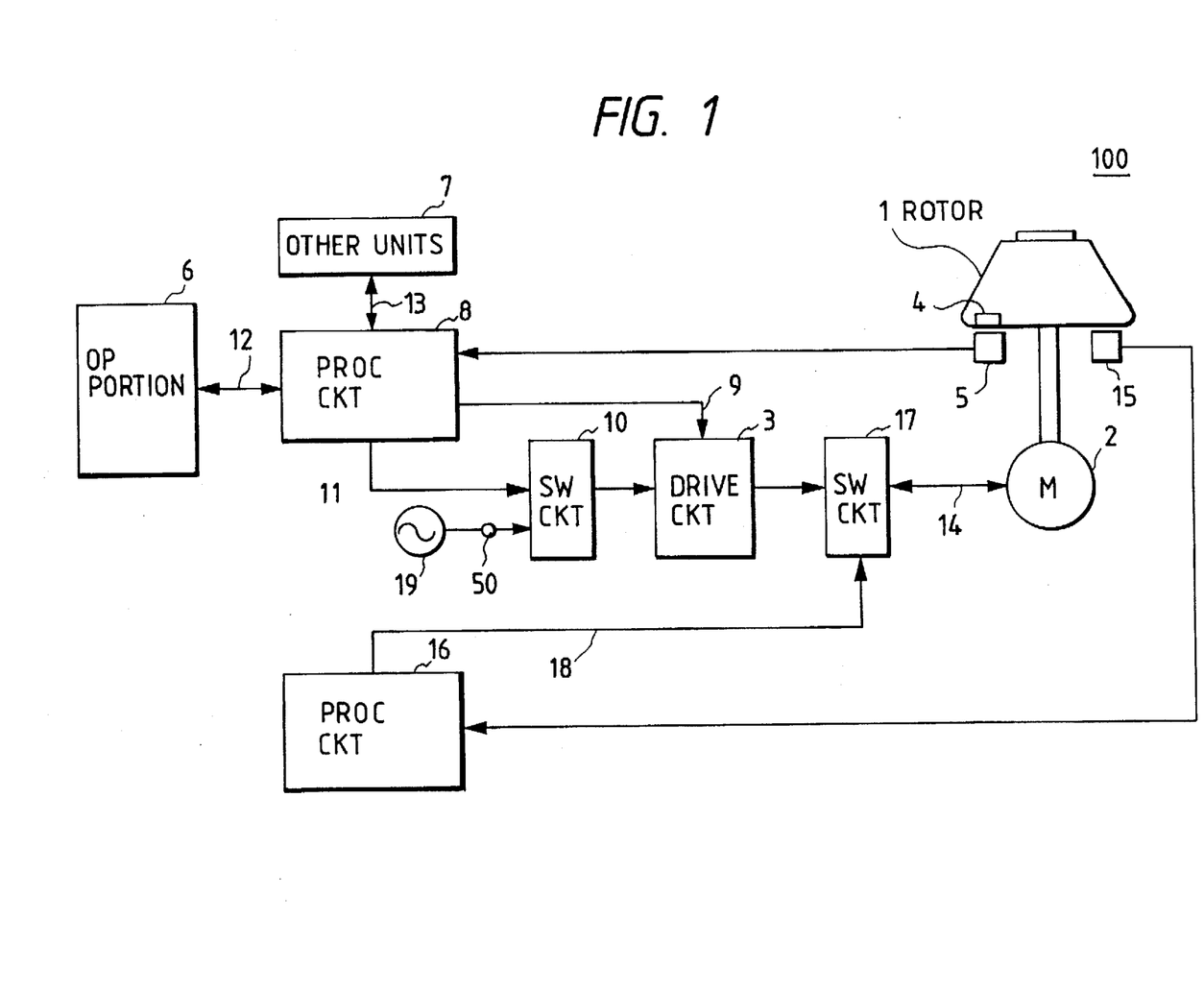
FIG. 1 is a block diagram of a centrifugal apparatus with overspeed protection of an embodiment.

Hereinbelow will be described an embodiment of this invention. FIG. 1 is a block diagram of a centrifugal apparatus with overspeed protection of this embodiment. The centrifugal apparatus with overspeed protection of this embodiment comprises an exchangeable rotor 1, magnets 4 as a marker, fixed to a a bottom of the rotor 1, for generating magnetic fields, a first detector 5, confronting the magnets 4, for detecting the magnetic fields and generating a first detection signal as an index signal, a first microprocessor (mpu) 33 for generating a rotation control signal 9, a first overspeed protection signal 11 in accordance with the first detection signal from the first detector 5 and an operation command, an operation portion 6 for supplying the operation command to the microprocessor 33 in response to an operation by an operator, a drive circuit 3 generating drive signals from a supply power, a motor 2 for rotating the rotor 1 in response to the drive signals 14, a first switch circuit 10 for controlling of supplying of a supply power from a power supply 19 to the drive circuit 3 in response to the first overspeed protection signal 11 from the microprocessor 33, a second detector 15 for detecting the magnetic fields and generating a second detection signal as an index signal, a second microprocessor 16 for generating a second overspeed protection signal 18 in accordance with the second detection signal, a second switch circuit 17 for controlling of supplying of drive signals 14 to the motor 2 in response to the second overspeed protection signal 18 from the second microprocessor 18, wherein the first and second microprocessors 33 and 38 detect the kind of the rotor by analyzing detected intervals of detection of magnet fields of the magnets 4 to detect the information of the kind of the currently set rotor 1 and determines a maximum rotation speed of the currently set rotor 1 to generate the first and second overspeed protection signals respectively.

The first and second detectors 5 and 15 comprise Hall elements which can be replaced by magneto-resistance elements or pickup coils. The microprocessor 33 also controls other units 7 such as a vacuum pump.

The rotation speed and the kind of the rotor 1 is independently detected by the first and second detectors 5 and 15 and the first and second microprocessors 33 and 38. Then, overspeed protection is independently effected by the first switch circuit 10 controlled by the microprocessor 33 and the second switch circuit 17 controlled by the microprocessor 33 in the series manner. Therefore, the double feedback lines for overspeed protection are perfectly formed, so that a degree of safety in the overspeed protection is considerably increased.

Figure 2:
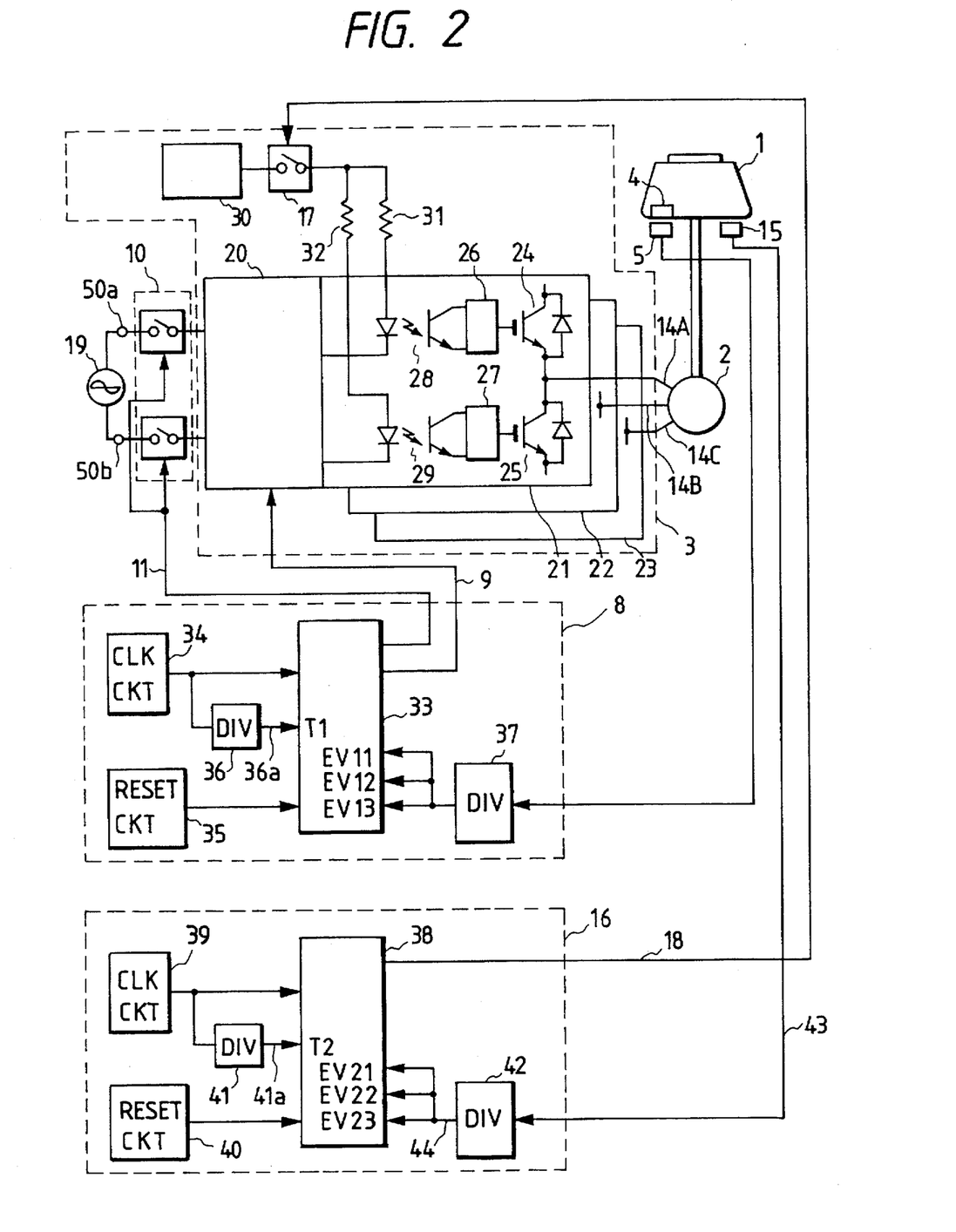
FIG. 2 is a partial detailed block diagram of the centrifugal apparatus with overspeed protection shown in FIG. 1.

FIG. 2 is a partial detailed block diagram of the centrifugal apparatus with overspeed protection shown in FIG. 1, wherein the other units 7 and the operation portion 6 are not shown. The power supply 19 supplies the supply power to the motor 2 through the switch circuit 10 and the drive circuit S. The drive circuit 3 comprises an inverter control circuit 20 for effecting an inverting control operation, that is, generating three-phase signals, and power bridge circuits 21 to 23 for supplying three-phase drive signals 14A to 14C to the induction motor 2. Each of the power bridge circuit comprises power transistors, IGBTs (Insulated Gate Bipolar Transistors), or GTOs (gate-turn-off switch) for example. The three-phase drive signals 14A to 14C are supplied from arms of the power bridge circuits 21 to 28 to the respective windings of the motor 3. As shown, the power bridge circuit 21 comprises IGBT 24 and IGBT 25, gate control circuit 28 and 27 for controlling the IGBTs 24 and 25, photocouplers 28 and 29 for energizing the IGBT in response to one of the three-phase signals from the inverter control circuit 20. The photocouplers 28 and 29 are supplied with a photocoupler supply power from a power supply 30 through the switch 17. Therefore, when the switch 17 is not in the overspeed protection mode indicted by the overspeed protection signal 18, the photo-couple supply power from the power supply 30 is supplied to the photocouplers 28 and 29 through the switch 17. Then, the inverter control circuit 20 supplies the three-phase signals to the photocouplers 28 and 29 and the three-phase drive signals are supplied to the motor when the microprocessor 33 supplies the rotation control signal indicative of the rotation of the rotor 1. When the switch 17 is in the overspeed protection mode indicted by the overspeed protection signal 18, the photocoupler supply power from the power supply 30 is not supplied to the photocouplers 28 and 29 through the switch 17. Then, though the inverter control circuit 20 supplies the three-phase signals to the photocouplers 28, the three-phase drive signals are not generated and the rotation of the rotor is protected or stopped because the photocouplers 28 and 29 are not energized.

The switch 10 comprises relays or semiconductor relays including triacs. When the switch 10 is in the overspeed protection mode indicted by the overspeed protection signal 11, the switch 10 does not supplies the supply power from the power supply 19 to the inverter circuit 20. Therefore, the three phase signals are not supplied to the motor though the microprocessor 33 supplies the rotation control signal indicative of the rotation of the rotor 1 and the rotation of the rotor 2 is protected or stopped.

When the switch 10 is not in the overspeed protection mode indicted by the overspeed protection signal 11, the supply power from the power supply 19 is supplied to the inverter circuit 20 through the switch 107. Then, the inverter control circuit 20 supplies the inverter signals to the photocouplers 28 and the three-phase drive signals are supplied to the motor 2 to rotate the rotor 1.

The microprocessor 33 has a clock input CLK1, a timer interruption input T1, event interruption inputs EV11 to EV13, and a reset input. A processing circuit including the microprocessor 33 has a clock circuit 34 for generating a first clock signal, a divider 36 for frequency dividing the first clock signal, a reset circuit 35 for resetting the microprocessor 33 by supplying a reset signal to the reset input, and a divider 37 for frequency dividing the first detection signal 15 and supplying the frequency divided first detection signal to the event interruption inputs EV11 to EV13. The microprocessor 38 has a clock input CLK2, a timer interruption input T2, event interruption inputs EV21 to EV23, and a reset input. A processing circuit 16 including the microprocessor 38 has a clock circuit 39 for generating a second clock signal, a divider 41 for frequency-dividing the first clock signal, a reset circuit 40 for resetting the microprocessor 38 by supplying a reset signal to the reset input, a divider 42 for frequency-dividing the first detection signal 15 and supplying the frequency divided first detection signal to the event interruption inputs EV21 to EV23.

Figure 3A:
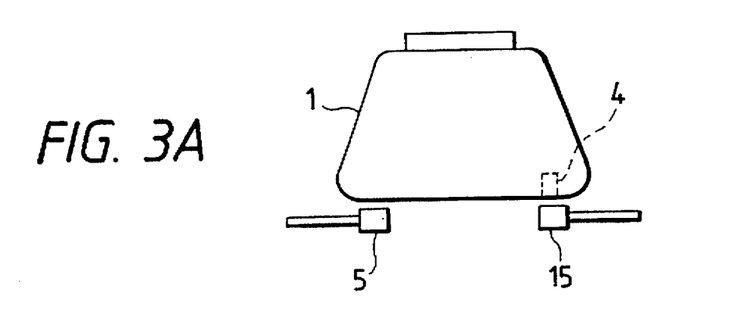
FIG. 3A is a side view of a rotor and first and second detectors shown in FIG. 1.
Figure 3B:
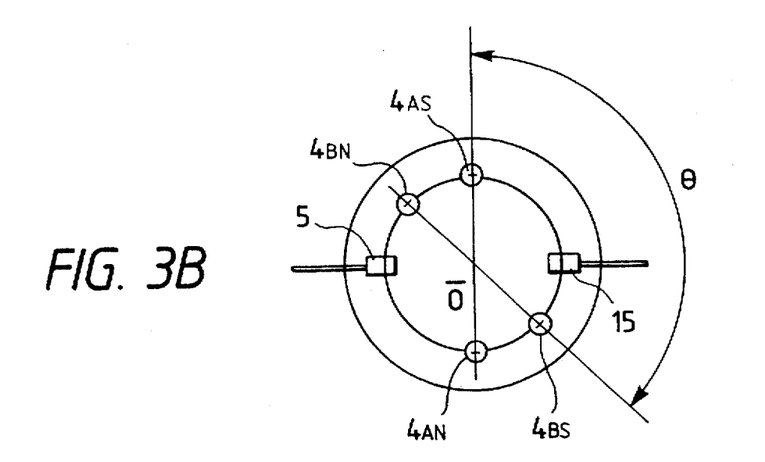
FIG. 3B is a bottom view of the rotor and the first and second detectors are also shown.

FIG. 3A is a side view of the rotor 1 and the first and second detectors 5 and 15 of this embodiment. FIG. 3B is a bottom view of the rotor and the first and second detectors are also shown. As shown in FIG. 3B, magnets 4AS and 4BS and balancers 4BN and 4AN are mounted on the bottom of the rotor 1 on the same circumference with a predetermined angle relation. More specifically, the magnets 4AS and 4BS generates magnetic fields showing S polarity to the first and second detectors 5 and 15 and located with a predetermined central angle θ with respect to a rotation axis of the rotor 1. On the other hand, the balancers 4AN and 4BN are located at counterbalance positions against the magnets 4AS and 4BS. That is, the balancers 4AN and 4BN are arranged at point symmetrical positions against the magnets 4AS and 4BS.

In this embodiment, the first and second sensors 5 and 15 detect the passing of the magnets 4AS and the 4BS therethrough. However, it is also possible that the balancers 4AN and 4BN comprise magnets arranged to show N polarity against the first and second detector 5 and 15. Then, the first detector detect passing of the S polarity of a magnet fields from the magnets 4AS and 4BS. On the other hand, the second detector 15 detects the magnetic fields of N polarity. Such a structure provides detection of a defect in the first or second detection signal, a decrease in the magnetic force of the magnets, and a defect of a magnet. Thus, it is possible to take a countermeasure operation.

Figure 4:
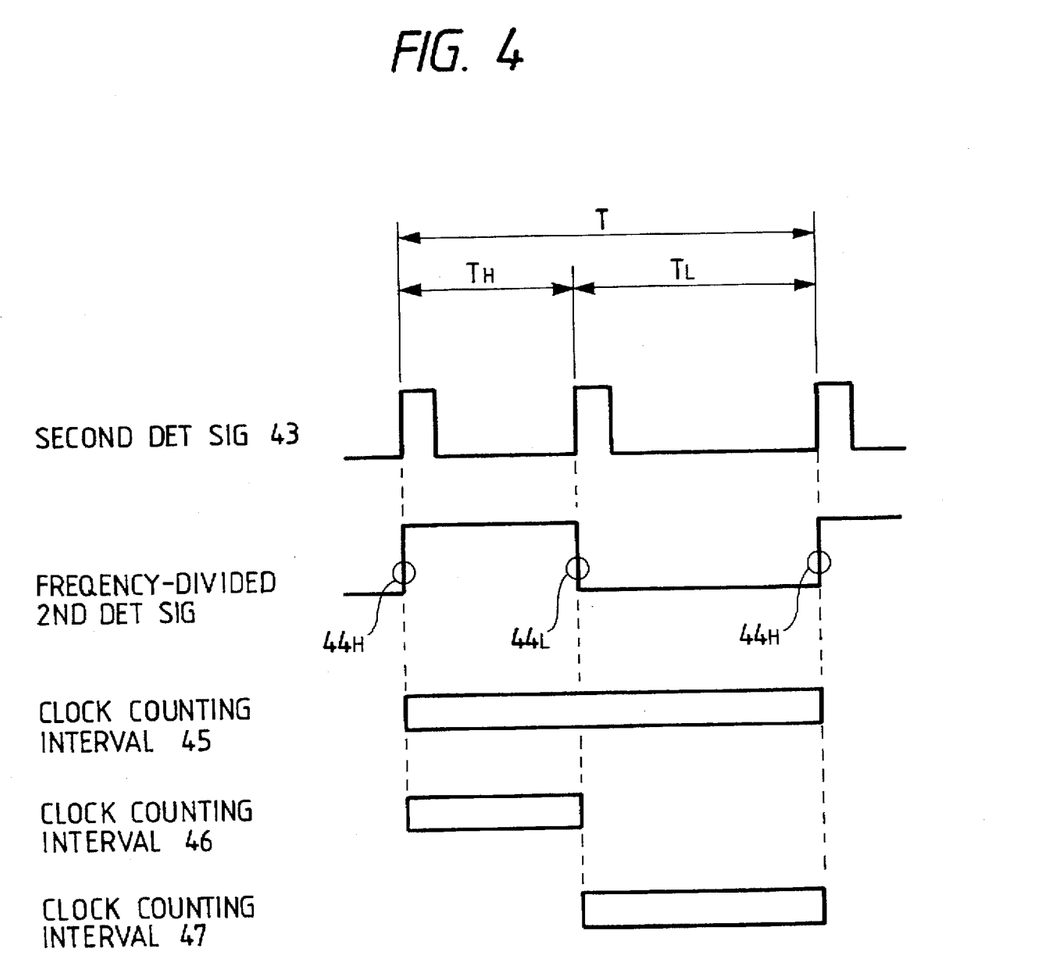
FIG. 4 is a graphic diagram of a time chart of this embodiment.
Figure 5:
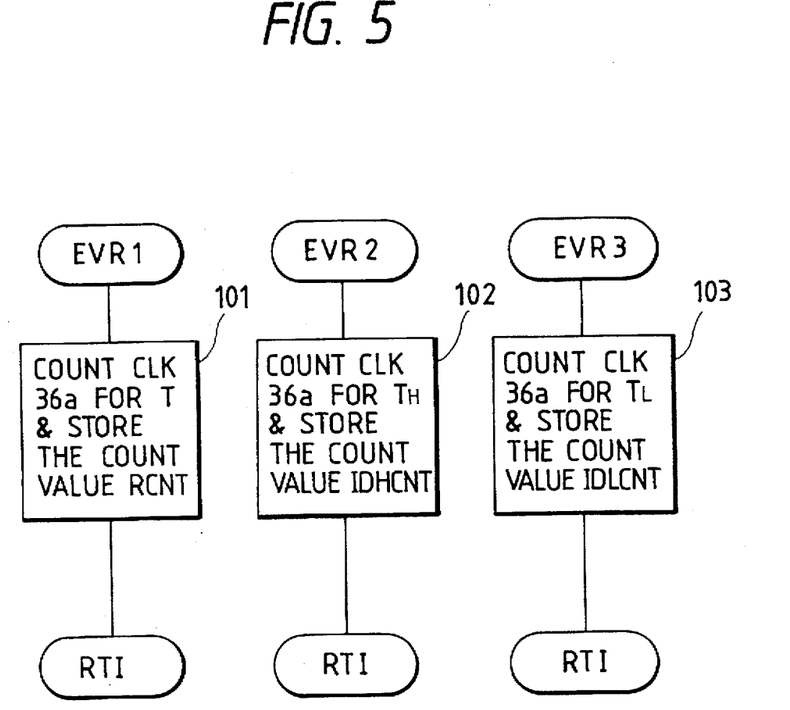
FIG. 5 is a diagram of flow charts of interruption operations.
Figure 6:
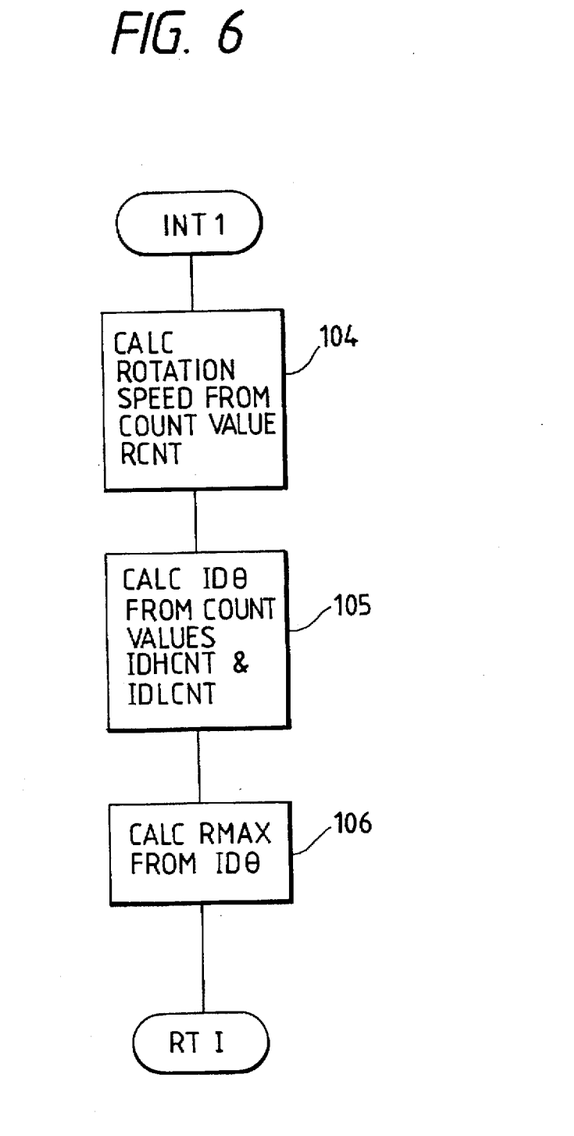
FIG. 6 is a diagram of a flow chart of a timer interruption operation.

FIG. 4 is a graphic diagram of a time chart of this embodiment. FIG. 5 is a diagram of flow charts of interruption operations. When the motor 2 is supplied with the three-phase drive signals from the dive circuit 3, the motor 8 begins to rotate. Then, the second detector 15 generates the second detection signal 43. That is, the second detector 15 generates two pulses per one rotation interval T of the rotor 1. The divider 42 frequency-divides the second detection signal and supplies the frequency divided second detection signal 44 having the interval T to the event interruption input EV21 to EV23. In this embodiment, microprocessor M37451 (Mitsubishi Electric company) is used as the microprocessors 33 and 38. In that microprocessor, an event interruption EVR1 for measuring a pule period is effected once rotation of the rotor 2 at a rising edge 44H of the frequency-divided second detection signal 44. In response to the event interruption EVR1, an interruption processing 101 is executed. That is, the microprocessor 38 counts pulses (3 MHz, for example) in the divided clock signal 41a for the one rotation interval T, i.e., a clock counting interval 45, and the count value RCNT is stored in a memory included in the microprocessor 38. Similarly, an event interruption EVR2 for measuring a period $T_H$ is effected once rotation of the rotor 2 at a rising edge 44H of the frequency-divided second detection signal 44 and finishes at the falling edge 44L of the frequency divided second detection signal. In response to the event interruption EVR2, an interruption processing 102 is executed. That is, the microprocessor 38 counts pulses in the divided clock signal 41a for an interval $T_H$ where the frequency-divided second detection signal is H, i.e., for a clock counting interval 46, and the count value IDHCNT is stored in a memory included in the microprocessor 38. Moreover, an event interruption EVR3 for measuring a period is effected once rotation of the rotor 2 at a falling edge 44L of the frequency-divided second detection signal 44 and finishes at the rising edge 44H of the frequency divided second detection signal. In response to the event interruption EVR3, an interruption processing 103 is executed. That is, the microprocessor 38 counts pulses in the divided clock signal 41a for an interval $T_L$ where the frequency-divided second detection signal is L, i.e., for a clock counting interval 47, and the count value IDLCNT is stored in a memory included in the microprocessor 38. The divider 41 supplies the frequency-divided clock signal 41 having a period of about 100 msec to the timer interruption input T2 of the microprocessor 38. FIG. 8 is a diagram of a flow chart of a timer interruption operation. This timer interruption operation INT1 is executed every 100 msec.

In step 104, the microprocessor 38 calculates an actual rotation speed RRPM of the rotor 1 from the count value RCNT in accordance with the following equation:

$$RRPM = (60 \times 3 \times 10^6)/\text{count value } RCNT \ [min^{-1}] \quad (1)$$

Then, the microprocessor 38 stores the actual rotation speed RRPM in the memory thereof. In the following step 105, the microprocessor 38 calculates a kind code iD θ of the rotor 1 from the count values IDHCNT and IDLCNT in accordance with the following equation:

$$ID\theta = (IDHCNT)/(IDHCNT + IDLCNT) \times 360° \text{ (when } IDHCNT \leq IDLCNT\text{)} \quad (2)$$

$$ID\theta = (IDLCNT)/(IDHCNT + IDLCNT) \times 360° \text{ (when } IDHCNT > IDLCNT\text{)} \quad (3)$$

In the following step 106, the microprocessor 38 calculates aN allowable maximum rotation speed RMAX in accordance with the following equation:

$$RMAX = k \times ID\theta \ [/min] \quad (4)$$

where k is a constant.

Figure 7:
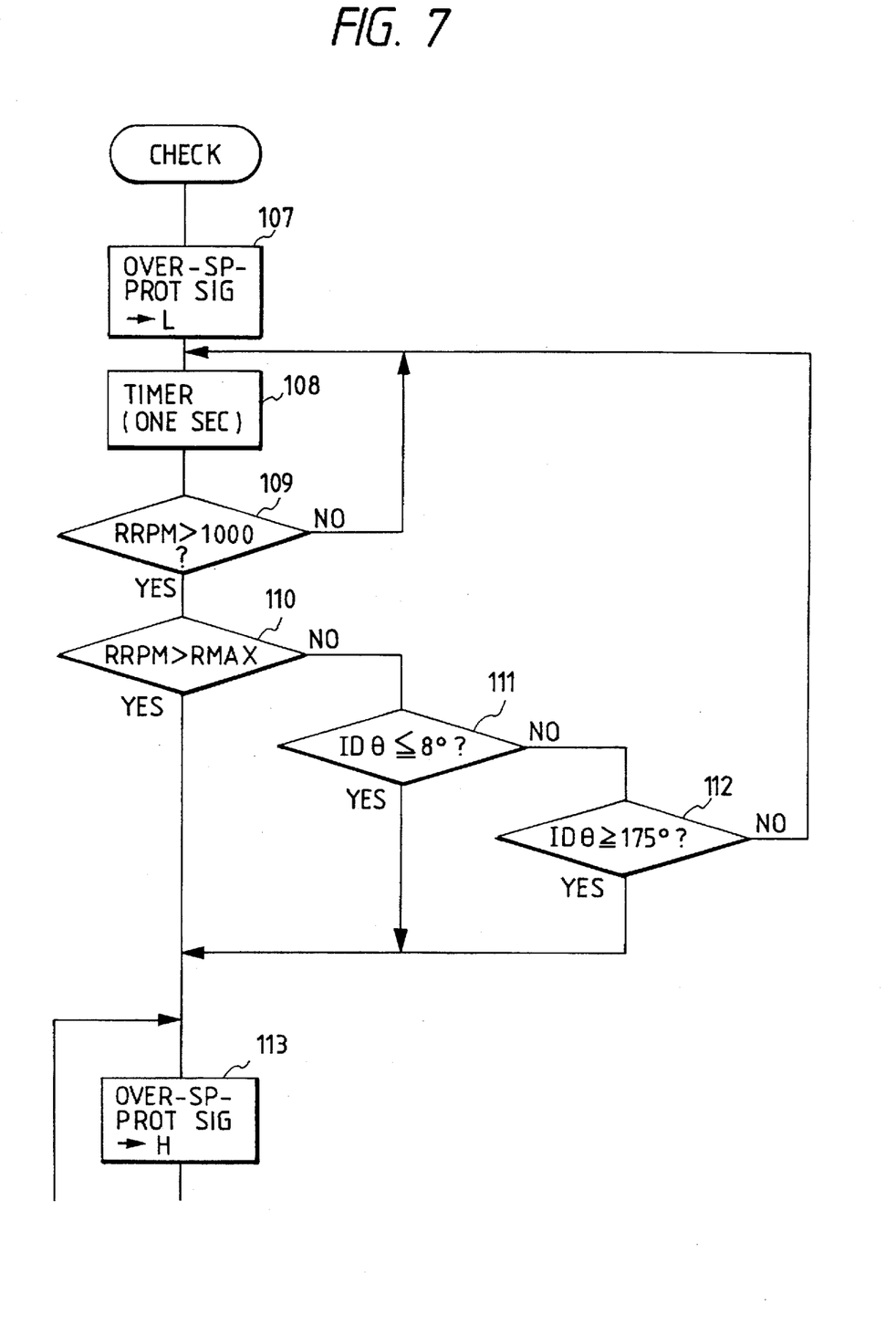
FIG. 7 is a diagram of a flow chart of this embodiment showing a check processing for the overspeed protection operation.

FIG. 7 is a diagram of a flow chart of this embodiment showing a check processing for the overspeed protection operation. This processing is executed in response to an initializing operation following to a power ON of this apparatus. In step 107, the microprocessor 38 makes the overspeed protection signal 18 L (logic low level). Then, it is possible to start to rotate the rotor 1. In this state, when an operator operates the operation portion 6 to command the rotation of the rotor 1, the rotor 1 begins to rotate in accordance with other operation program (not shown). In the following step 108, the microprocessor 38 waits for one second. In the following step 109, the microprocessor 38 makes a decision as to whether or not the rotation speed RRPM is larger than 1000 rpm. If the rotation speed RRPM is not larger than 1000 rpm, processing returns to step 108. That is, if the rotation speed is less than 1000 rpm, this centrifugal apparatus may be in the condition of exchanging of rotor 1, in a power fail, or the like, so that the processing for the overspeed protection is not effected. If the rotation speed RRPM is larger than 1000 rpm, the microprocessor 38 makes a decision as to whether or not the rotation speed RRPM is larger than the allowable maximum rotation speed RMAX in step 110. If the rotation speed RRPM is larger than the allowable maximum rotation speed RMAX, the microprocessor makes the overspeed protection signal 18 H (logic high level) in step 113. Therefore, if the rotation speed RRPM is larger than 1000 rpm and the allowable maximum rotation speed RMAX, the microprocessor 38 stops the rotation of the rotor 1 using the switch 17.

In step 110, when the rotation speed RRPM is not larger than the allowable maximum rotation speed RMAX, the microprocessor 38 makes a decision as to whether or not ID$\theta \leq 8°$ in step 111. If ID$\theta \leq 8°$, the microprocessor 38 judges that the kine code is incorrectly detected, that is, there is an abnormal state, such as a defection of the magnet 4AS or 4BS. Then, the microprocessor 38 makes the overspeed protection signal H to stop the rotor 1 in step 113. Similarly, if ID$\theta > 8°$, the microprocessor makes a decision as to whether or not ID$\theta \geq 175°$, if ID$\theta < 175°$, processing returns to step 108 because this condition is judged as a normal condition. If ID$\theta \geq 175°$, the microprocessor 38 judges that the kine code is incorrectly detected, that is, there is the abnormal state. Then, the microprocessor 38 makes the overspeed protection signal 18 H to stop the rotor 1 in step 113.

Once the processing of step 113 is executed. The processing loops there. Therefore, the protection is maintained until a power of this apparatus is turn off. When this apparatus is powered on again, the reset circuits 35 and 40 detect this and the microprocessors 33 restart this program after the initializing operation such as setting of the timer interruption, event interruptions, and clearing of the memory and setting variables. That is, the switch circuit 17 keeps this stop condition until a reset signal is inputted.

In the processing of step 112, if either of the magnet 4AS or 4BS detaches from the rotor 1 or if the detection signal which should be outputted twice a rotation of the rotor 1 is outputted once a rotation of the rotor 1 due to a decrease in the sensitivity of the magnet field of either of the magnet 4AS or 4BS, the frequency divided detection signal has a duty ratio of 50%. Then, the calculated ID $\theta$ may be a value near 180°. Similarly, if ID $\theta$ is less than 8°, it is considered that there is some trouble in the detection of the magnet 4AS or 4AB. Therefore, the defection in either of the magnet 4AS and 4AB can be detected to the steps 111 or 112. That is, the kind code is incorrectly detected.

Figure 8:
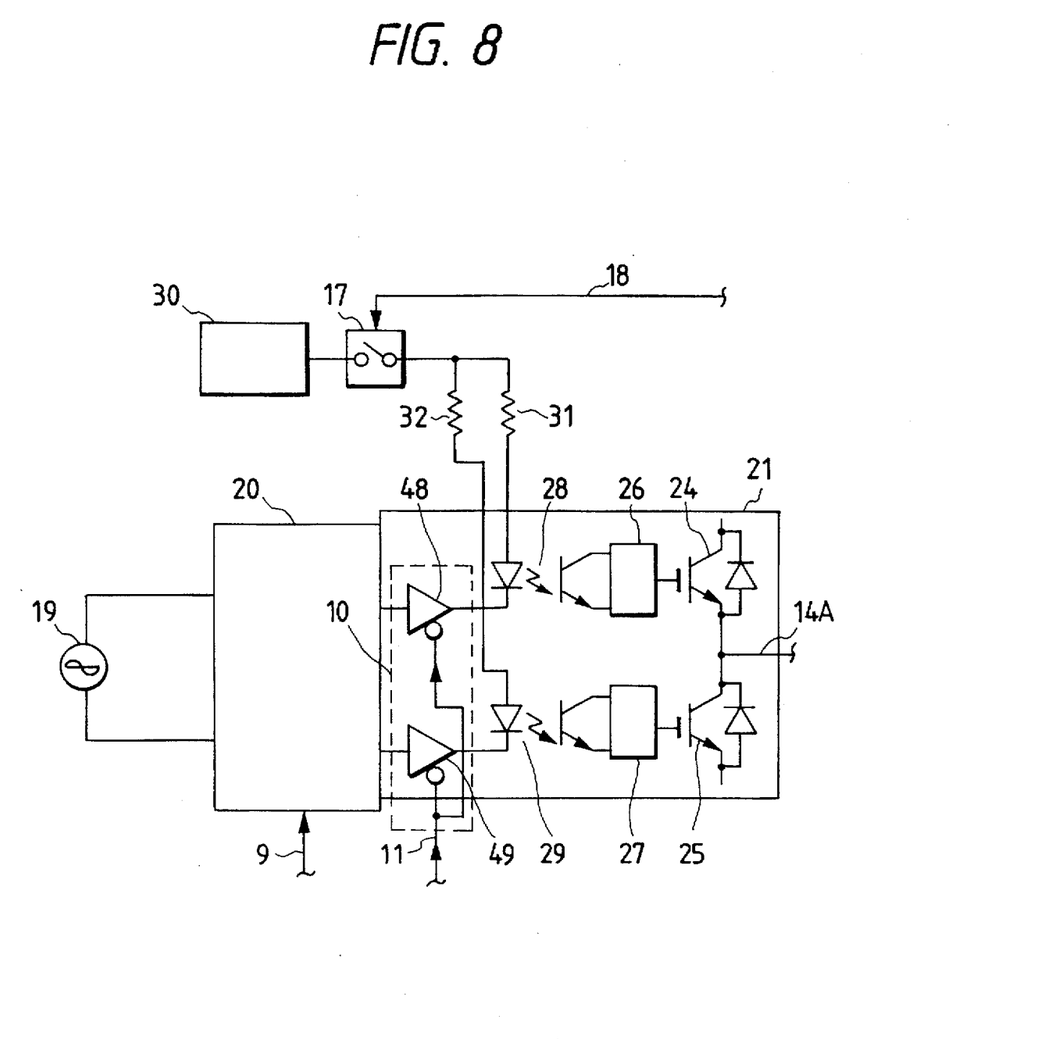
FIG. 8 is a partial block diagram of a modification of the centrifugal apparatus with overspeed protection of this embodiment.

FIG. 8 is a partial block diagram of a modification of the centrifugal apparatus with overspeed protection of this embodiment. The basic structure is similar to the overspeed protection apparatus shown in FIGS. 1 and 2. The difference in that the switch circuit 10' comprises a tristate buffer driver circuits 48 and 49. The tristate gate buffer driver circuits 48 and 49 are made in a high impedance condition in response to the logic H level of the overspeed protection signal 11. Then, the rotation of the rotor 1 is stopped. The microprocessor 33 also detects the kind code and the actual rotation speed from the detector 5 and generates the overspeed protection signal 11 similarly. Therefore, the detection of the actual speeds and the kind codes are effected and generating the overspeed protection signals 11 and 18 independently at the same time substantially. Moreover, the switch circuit 10 responsive to the overspeed protection signal 11 and the switch circuit 17 responsive to the overspeed protection signal 18 operated independently but in the series manner, so that a perfect overspeed protection is provided against a single trouble in this centrifugal apparatus.

In this embodiment, the feedback for protection of the overspeed of the rotor is doubled by providing the two magnets 4AS and 4BS, detectors 5 and 15, microprocessors 33 and 38, and switch circuits 10 and 17. Similarly, the feedback for the protection of the overspeed of the rotor 1 may be tripled by providing a third detector, a third processor and a third switch circuit connected in the series manner.

In this embodiment, the kind of the rotor 1 and the rotation speed are detected through magnetic fields. However, the kind of the rotor 1 and rotation speed can be detected by an optical manner or using ultra-sonic waves or electromagnetic waves. Moreover, the indexes provided to the rotor in place of the magnets 4AS and 4BS may be modified in the number, or the central angle of the mounted indexes. Moreover, a complicated pattern of the marker may be used with a magnetic recording medium or an optical recording medium.

What is claimed is:

1. A centrifugal apparatus comprising:
  rotor having marker means;
  a motor operating responsive to a drive signal for rotating said rotor;
  first detection means for detecting said marker means with rotation of said rotor and generating a first detection signal;
  second detection means for detecting said marker means with said rotation of said rotor and generating a second detection signal;
  an input terminal for receiving a supply power;
  a drive circuit responsive to a command for generating said drive signal from said supply power in accordance with said first detection signal;
  first and second switch circuits for controlling supply of said drive signal to said motor, said first and second switch circuits being provided in a route from said input terminal and said motor via said drive circuit;
  first judging means for receiving said first detector signal and detecting whether said first detection signal is generated within a predetermined condition and for operating said first switch circuit to stop said drive signal from being supplied to said motor when said first detection signal is not generated within said predetermined condition; and
  second judging means for receiving said second detection signal and detecting whether said second detection signal is generated within said predetermined condition and for operating said second switch circuit to stop said drive signal from being supplied to said motor when said second detection signal is not generated within said predetermined condition.

2. A centrifugal apparatus as claimed in claim 1, wherein said first and second judging means independently detect first and second rotation speeds from said first and second detection signals respectively, said first and second judging means independently detect whether said first rotation speed exceeds a predetermined value and whether said second rotation speed exceeds said predetermined value respectively, said first judging means controls said first switch to stop said drive signal from being supplied to said motor when said first rotation speed exceeds said predetermined value, and said second judging means controls said second switch to stop said drive signal from being supplied to said motor when said second rotation speed exceeds said predetermined value.

3. A centrifugal apparatus as claimed in claim 1, wherein said rotor is detachable from said motor and said marker means has information indicative of a kind of said rotor, said first and second judging means further detect said information from said first and second detection signals respectively and determine first and second maximum values in accordance with said detected information respectively, said first judging means operates said first switch to stop said drive signal from being supplied to said motor when said first rotation speed exceeds said first maximum value, and said second judging means operates said second switch to stop said drive signal from being supplied to said motor when said second rotation speed exceeds said second maximum value.

4. A centrifugal apparatus as claimed in claim 1, wherein said marker means comprises at least a magnet.

5. A centrifugal apparatus as claimed in claim 1, wherein said drive circuit comprises an inverter circuit for generating phase signals and a power bridge circuit for generating said drive signal from said phase signals and said first switch circuit is provided between said input terminal and said inverter circuit.

6. A centrifugal apparatus comprising:
    rotor having marker means;
    a motor operating responsive to a drive signal for rotating said rotor;
    first detection means for detecting said marker means with rotation of said rotor and generating a first detection signal;
    second detection means for detecting said marker means with said rotation of said rotor and generating a second detection signal;
    an input terminal for receiving a supply power;
    a drive circuit responsive to a command for generating said drive signal from said supply power in accordance with said first detection signal;
    first and second switch circuits for controlling of supplying said drive signal to said motor, said first and second switch circuits being provided in a route from said input terminal and said motor via said drive circuit;
    first judging means for receiving said first detector signal and detecting whether said first detection signal is generated within a predetermined condition and for operating said first switch circuit to stop said drive signal from being supplied to said motor when said first detection signal is not generated within said predetermined condition; and
    second judging means for receiving said second detection signal and detecting whether said second detection signal is generated within said predetermined condition and for operating said second switch circuit to stop said drive signal from being supplied to said motor when said second detection signal is not generated within said predetermined condition;
    wherein said drive circuit comprises an inverter circuit for generating phase signals and a power bridge circuit for generating said drive signal from said phase signals and said first switch circuit is provided between said input terminal and said inverter circuit; and
    wherein said second switch circuit comprises photocouplers transmitting said phase signals to said power bridge circuit, a switch, and a power source for supplying a power to said photocouplers through said switch and said second judging means controls said second switch circuit to stop said drive signal from being supplied to said motor by controlling said switch when said second detection signal is not generated within said predetermined condition.

7. A centrifugal apparatus comprising:
    rotor having marker means;
    a motor operating responsive to a drive signal for rotating said rotor;
    first detection means for detecting said marker means with rotation of said rotor and generating a first detection signal;
    second detection means for detecting said marker means with said rotation of said rotor and generating a second detection signal;
    an input terminal for receiving a supply power;
    a drive circuit responsive to a command for generating said drive signal from said supply power in accordance with said first detection signal;
    a first switch circuit for controlling supply of said supply power to said drive circuit;
    a second switch circuit for controlling supply of said drive signal to said motor; first judging means for receiving said first detector signal and detecting whether said first detection signal is generated within a predetermined condition and for operating said first switch circuit to stop said supply power from being supplied to said motor when said first detection signal is not generated within said predetermined condition; and
    second judging means for receiving said second detection signal and detecting whether said second detection signal is generated within said predetermined condition and for operating said second switch circuit to stop said drive signal from being supplied to said motor when said second detection signal is not generated within said predetermined condition.

8. A centrifugal apparatus as claimed in claim 7, wherein said first and second judging means independently detect first and second rotation speeds from said first and second detection signals respectively, said first and second judging means independently detect whether said first rotation speed exceeds a predetermined value and whether said second rotation speed exceeds said predetermined value respectively, said first judging means controls said first switch to said supply power from being supplied to said drive circuit when said first rotation speed exceeds said predetermined value, and said second judging means controls said second switch to stop said drive signal from being supplied to said motor when said second rotation speed exceeds said predetermined value.

\* \* \* \* \*